United States Patent [19]

Immler et al.

[11] Patent Number: 4,538,072
[45] Date of Patent: Aug. 27, 1985

[54] OPTICAL WAND FOR READING OCR CHARACTERS AND BAR CODE MARKS

[75] Inventors: Josef Immler, Puchheim; Cornelis van der Sel, Grafing, both of Fed. Rep. of Germany

[73] Assignee: Siemens Aktiengesellschaft, Berlin and Munich, Fed. Rep. of Germany

[21] Appl. No.: 486,587

[22] Filed: Apr. 19, 1983

[30] Foreign Application Priority Data

Apr. 20, 1982 [DE] Fed. Rep. of Germany ....... 3214621

[51] Int. Cl.³ ............................................. G06K 7/10
[52] U.S. Cl. ..................................... 250/568; 382/62; 235/440; 235/472
[58] Field of Search ............... 235/440, 472, 462, 436; 382/62; 250/216, 239, 566, 568

[56] References Cited

U.S. PATENT DOCUMENTS

| | | | |
|---|---|---|---|
| 3,410,991 | 11/1968 | Van Berkel | 235/437 |
| 3,784,794 | 1/1974 | Allais | 235/61.11 E |
| 3,892,974 | 7/1975 | Ellefson et al. | 250/568 |
| 3,895,350 | 7/1975 | De Vries | 382/62 |
| 3,949,363 | 4/1976 | Holm | 235/462 |
| 3,961,198 | 6/1976 | Aungst | 250/216 |
| 4,005,287 | 1/1977 | Cook | 250/568 |
| 4,246,570 | 1/1981 | Kochert et al. | 340/146.354 |
| 4,250,488 | 2/1981 | Haupt | 250/205 |
| 4,262,280 | 4/1981 | Kochert | 340/146.3 AG |
| 4,402,088 | 8/1983 | McWaters et al. | 235/440 |
| 4,411,016 | 10/1983 | Wakeland | 235/462 |

FOREIGN PATENT DOCUMENTS 0062777 10/1982 European Pat. Off. .
0063243 10/1982 European Pat. Off. .

Primary Examiner—David C. Nelms
Assistant Examiner—J. Jon Brophy
Attorney, Agent, or Firm—John Francis Moran

[57] ABSTRACT

Optical wand for automatic character recognition including a scanner unit designed to be a manually movable along a line of print of a data carrier in order to recognize optical characters and incorporating a light source for illuminating a scanning window and a sensing device. A second scanner unit includes a second sensing device and is designed for recognizing bar code marks. A gun shaped housing forms a common case for both scanner units.

5 Claims, 7 Drawing Figures

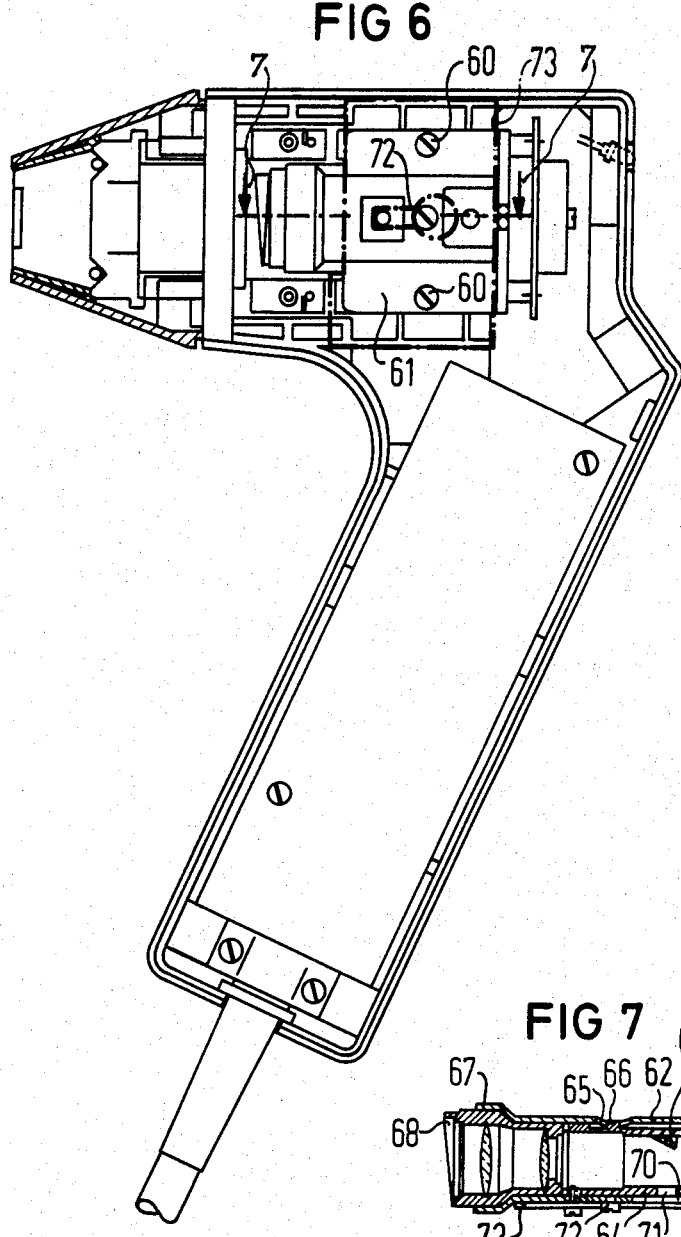
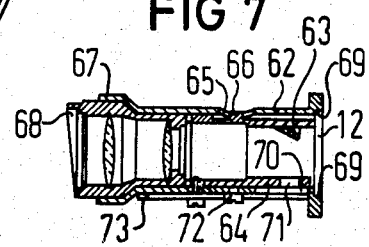

OPTICAL WAND FOR READING OCR CHARACTERS AND BAR CODE MARKS

BACKGROUND OF THE INVENTION

The invention is related to to an optical wand for automatic character recognition including a scanner unit designed to be manually movable along a line of print of a data carrier in order to recognize optical characters. The hand held optical reader includes a light source for illuminating a scanning window, and a sensor device for sensing the area of the data carrier currently appearing in the scanning window.

Such sensing devices are utilized with automatic character recognition in order to convert visually readable characters imprinted on a data carrier, i.e. a voucher, a letter or a label directly into a format which can be automatically analyzed and processed. The string of information corresponding to recognized characters is usually furnished to a data processing system or a peripheral unit such as a printer for further processing. By means of an example, U.S. Pat. No. 4,250,488 discloses such an optical device for automatic character recognition which is designed for reading standardized alpha numeric optical characters, such device is usually designated as optical character recognition (OCR) reader.

A different group of automatic recognition devices incorporates devices designed for recognizing coded data imprinted on labels. The coded information is very often represented by so called bar code marks and corresponding reading devices are commercially available, one example is the Ruby Wand Light Pen, model 1240 manufactured and sold by Intermec, Lynnwood, Wa. 98036.

Automatic reading devices designed for recognizing bar code marks have a structure which is quite different from above mentioned devices suitable for optical character recognition. This is quite understandable in view of the totally different appearance of the printed information. OCR readers are designed to sense an area appearing in the scanning window of the reader point-to-point and in parallel thus enabling to reconstruct segments or at least elements of a character. Bar code readers, on the contrary, are much less complicated. A single sensing device associated with an appropriate light source scans the series of bar codes and interprets the apperance of black and white elements in dependence upon a predetermined threshold and derives therefrom a pulse train which is supplied to an evaluation unit.

Bar codes and OCR fonts are commercially utilized in various areas of business and are preferably utilized for making different groups of goods. OCR fonts are very often applied to checks, labels of dresses and a variety of technical articles whereas the bar code marking finds its main application for identifying packaged food. It is conceivable that some businesses, such as department stores sell goods belonging to either one of these two groups. It is therefore necessary to provide for both types of reading devices. This approach means some inconvenience for the organization of sales in such departments stores; it is inefficient and especially impractical for operators such as cashiers to work with different wands for different groups of labels.

U.S. Patent. 3,410,991 discloses a reading device for a data carrier bearing simultaneously a line of visually readable characters and associated therewith corresponding bar code marks imprinted below the respective optical characters. The known reading device includes scanner units designed for sensing the characters and the associated bar code marks simultaneously at several horizontal levels in order to achieve a high scanning immunity in view of tolerances of vertical misalignment of the scanner. The known reading device, however, is not designed for recognizing OCR fonts and bar code marks alternatively.

European Patent Application No. 0,062,777 discloses a combined OCR and bar code reader utilizing a single area array for sensing OCR fonts or bar codes. In other words, the sensor array designed for sensing OCR fonts is also utilized for sensing bar code marks and measures have to be taken in the evaluation unit to distinguish between signal information associated with an OCR font and a bar code, respectively. This kind of a combinative use of a single sensing device for both groups of markings by means of a common sensor array seems to make efficient use of a reading device for different purposes but has some disadvantages. The general difference between recognizing OCR fonts and bar code marks, has been outlined above; it is therefore conceivable that a device utilized for reading both types of markings cannot be as exactly adjusted to all requirements as would be desirable for conditions which are contradictory for reading optical characters and bar code marks, respectively. Furthermore, in case of a failure of the sensor device the entire reader will be out of order.

SUMMARY OF THE INVENTION

It is therefore a main object of the present invention to provide for an improved hand held optical reader suitable for recognizing alternatively both visually readable characters and bar code marks.

It is a further object of the present invention to provide for such a combined hand held wand which is specifically designed for high performance with respect to both recognizing of visually readable characters and bar code marks, the design taking into consideration the significantly different conditions for recognizing both types of markings.

It is a further object of the present invention to provide for such a hand held wand which is designed to be manufactured, assembled and maintained at low cost and still provides for a high reability.

These objects, as well as other objects which will become apparent from the description which follows, are achieved by an improved optical wand for automatic character recognition including a scanner unit designed to be manually movable along a line of print of a data carrier in order to recognize optical characters and including a light source for illuminating a scanning window, and a sensor device for sensing the portion of the data carrier appearing in the scanning window. This optical wand incorporates a second scanner unit including a second sensing device wherein the second scanner unit is designed for recognizing bar code marks. In addition, a gun shaped housing is provided which housing forms a common case for both scanner units.

This structure combines the function of an OCR reading device and a bar code reader in a manner that both sections can be alternatively utilized for either OCR fonts or bar code marks, as the case may be. In accordance with a preferred embodiment of the present invention this housing includes a scanning tip and an optical system arranged therein, wherein the optical system incorporates an aperture commonly utilized for scanning both optical characters and bar code marks and further includes means for deflecting a scanning beam associated with one of the scanning units onto a respective one of the sensor devices. This structure offers a possibility for utilizing one optical system for sensing both types of markings, wherein the different appearance of both types of markings and the corresponding changing conditions for sensing the same are advantageously utilized to deflect a portion of the reflected light. Light beams are thus focused onto the sensing device associated with sensing bar code marks without disturbance and loss of light of the light portion illuminating the sensor array associated with sensing visual characters.

Further details and advantages of the present invention will become more apparent from the detailed description of preferred embodiments, which follows.

BRIEF DESCRIPTION OF THE DRAWINGS

A better understanding of the invention may be had by reference to the following description of preferred embodiments in conjunction with the accompanying drawings, in which:

FIG. 6 represents a sectional view of a another embodiment of a hand held wand incorporating an integrated, replaceable optical system; and FIG. 7 represents a sectional view taken along line 7—7 of FIG. 6 and illustrating details of the optical system.

DETAILED DESCRIPTION OF PREFERRED EMBODIMENTS

Figure 1:
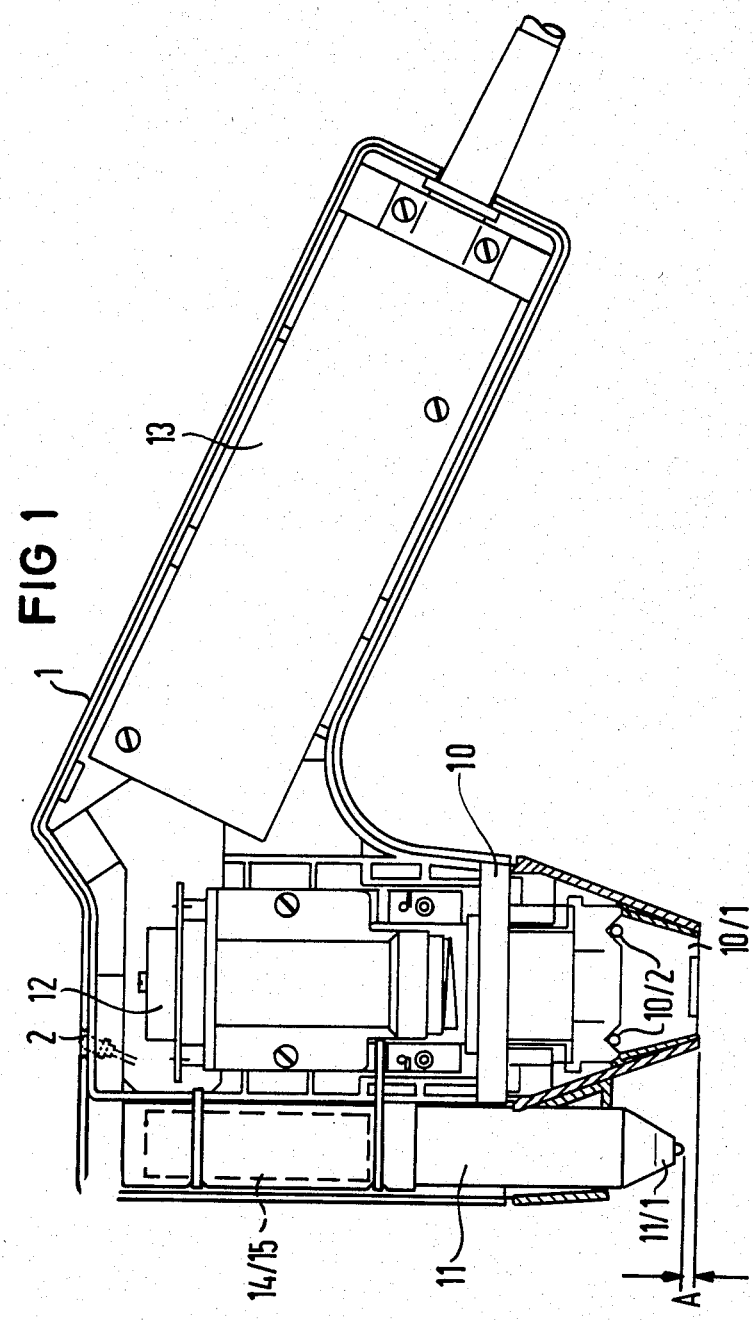
FIG. 1 shows schematically a sectional view of a hand held wand.

The hand held wand shown in FIG. 1 is designed for use with recognizing optical character recognition (OCR) fonts and coded information imprinted on a data carrier in form of bar code marks, as well. The reading device is provided with a gun shaped housing 1 and two sensor units 10, 11 arranged therein which allow for recognizing an OCR font and bar code marks, respectively. Both sensor units 10 and 11 are completely separated and arranged aside from each other. Both sensor units have slightly different sensing planes which are vertically spaced apart by a distance designated by A. The illustration of FIG. 1 is approximately in size and it may be thus obtained that this distance A in an actual implementation has a size of several millimeters. This arrangement makes it possible to select and activate one of the sensor units in order to perform a corresponding recognition procedure simply by tilting the manually operated hand held wand.

The sensing plane of the bar code sensor unit 11 is determined by the tip of the sensor head 11/1 whereas the corresponding sensing plane of the OCR sensor unit 10 is defined by a sensing window 10/1 in conjunction with a correspondingly arranged light source arrangement 10/2. The hand held wand is in operative mode when an indicator lamp 2 is illuminated. In this mode the hand held wand is ready to be moved across a line of markings imprinted on a label, a voucher etc., utilizing either sensor unit 10 or 11, as the case may be in accordance with the type of markings to be scanned.

Figure 2:
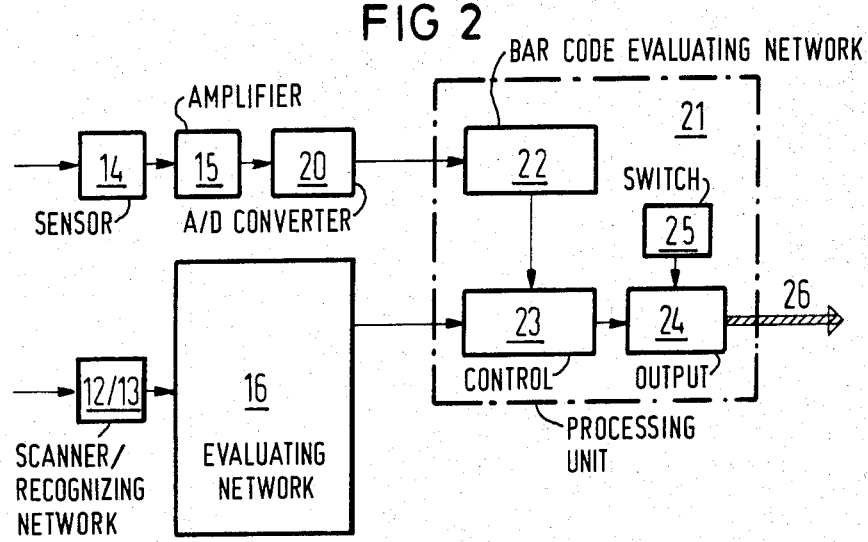
FIG. 2 represents a block diagram of the sensing and evaluating networks designed for use with the reading device of FIG. 1.

The recognition of sensed characters or coded markings, as such, as of minor importance with respect to the present invention, is known to those skilled in the art and is therefore not described in full detail. However, an outline of the recognizing and evaluation process will be given in the following in conjunction with the block diagram of FIG. 2.

The OCR sensor unit 10 reproduces character segments on a sensor array comprising a photodiode matrix 12, schematically indicated in FIG. 1. Electronic signals corresponding to such character segments are electronically preprocessed and digitalized in a recognizing network 13. The sensor array 12 and this recognizing network are commonly illustrated in FIG. 2 by one block designated 12/13. The preprocessed signals are then supplied to an evaluating network 16 which may be implemented in the form of a microprocessor system. Implementations of the recognizing network and the evaluating network may be obtained from U.S. Pat. Nos. 4,250,488 and 4,246,570, respectively, further detailed description therefore is deemed not be necessary. The processed signals are then furnished to a modified bar code processing unit 21 for further processing and transmission.

On the other hand, the optical signals representing the sensed bar code information are supplied to an optoelectronic converter 14 for converting the same into electrical signals. These electrical signals are amplified by means of an analog signal amplifier 15 connected to the output of converter 14. Output signals of the analog amplifier 15 are forwarded to an analog-to-digital converter 20 and are then supplied in digital form to the same modified bar code processing unit 21. This processing unit incorporates a bar code evaluating unit 22 which derives bar code marks from the received pulse train, eliminates noise signals and associates the recognized marks with one of n predetermined bar codes. Furthermore, the processing unit 21 recognizes the direction of the course of the scanning process, i.e., it is recognized whether the markings were sensed in forward direction or in backward direction. Furthermore, the recognized code is evaluated and a character check is executed for determining invalid codes.

Both sensor units are active simultaneously during the scanning process, this means black/white transitions are recognized in both sensor units and accordingly both the evaluating network 16 and the bar code processing evaluating unit 22 are active in processing the respective information supplied. To this reason, the different results are discriminated by means of a further validity check which is performed by a control unit 23 commonly coupled to both evaluating networks. This control unit performs a transfer control for information received from either one of the sensor units, on the one hand and generates control instructions, on the other hand. It includes, among others, a network for performing a validity check of the electrical signals and the corresponding data based upon the principle of highest probability. Depending upon the result of this check the data blocks received from either the OCR evaluating network 16 or from the bar code evaluating unit 22 are selected and control signals are added identifying the selected block as belonging to an OCR data block or bar code data block.

The output of the control unit is connected to inputs of an output unit 24 which operates under control of an interface switch 25. Output unit 24 and interface switch 25 and their specific functions depend upon the characteristics of a terminal (not shown) or a processing system which looks at the hand held wand as a peripheral. The output unit 24 in cooperation with interface switch 25 has the object to operate as a transmitter for transmitting the received data blocks with appropriate timing and framing aross an interface schematically indicated by arrow 26 in accordance with data transmission procedures specified by the interface characteristic of a receiving unit (not shown). The processing unit which may be implemented as a microprocessor system is ready for evaluating further information representing scanned data as soon as such data transmission is completed.

Figure 3:
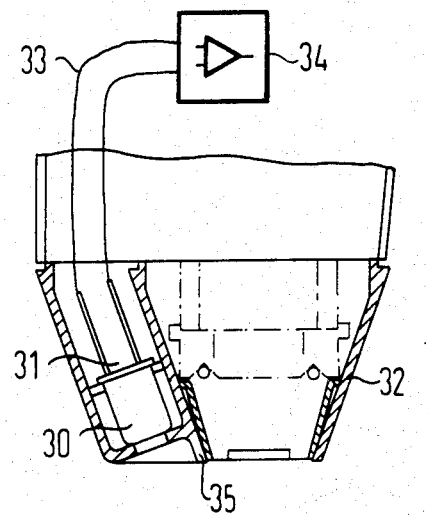
FIG. 3 represents a second embodiment by means of a sectional partial view illustrating the design of a scanning tip for use with such a combined hand held wand.

The embodiment represented in FIG. 1 is only one of several possibilities for designing such a hand held wand for combinative use incorporating two separate sensor units. FIG. 3 illustrates an example of a different implementation of the same design concept illustrated by means of a partial sectional view of a scanning tip 32 including a reflective-light sensor 30 incorporating the bar code scanning unit wherein both scanning systems are separated from each other by a dividing wall 35. The mounting area of the reflective-light sensor 30 is designed as a receptacle wherein the reflective-light sensor 30 is secured by means of a spring 31.

The scanning tip can be removed from the housing of the hand held wand to make the reflective-light sensor 30 accessible and removable by lifting the spring 31. This allows for easy assembly and disassembly, thereby simplifying maintenance and test procedures. A shielded multi-wire conductor 33 connects the reflective-light sensor 30 whose operation corresponds to that of the analog signal amplifier 15 shown in FIG. 2.

Figure 4:
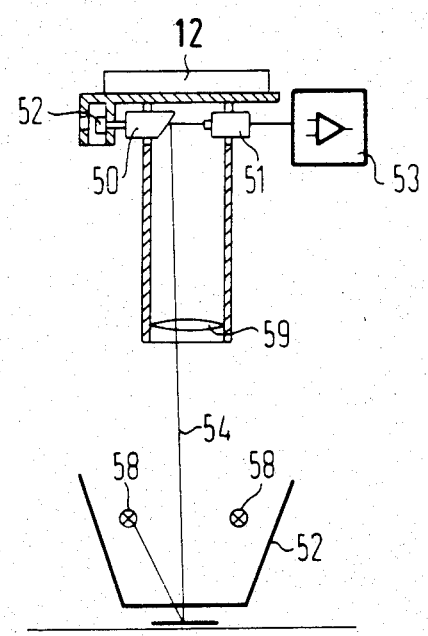
FIG. 4 illustrates schematically an optical system of another embodiment of a combined hand held wand, wherein both sensor units are integrated into one optical arrangement.

FIG. 4 represents another implementation of the optical system of the combined hand held wand in an schematical illustration. This implementation is in so far unique that both sensor units are integrated with each other by providing a common scanning window for the scanning operation of both sensor units. The scanning tip 52 incorporates just one light source arrangement 58 commonly used for both operations. Reflected light—indicated by light beam 54—is received through a lens system 59 and is focused onto a sensor array 12 which is provided for recognizing OCR character segments. A part of the reflected light received through the lens system 59 is deviated by means of an deviating prism 50 which receiving surface is pitched by 45 degrees against the central optical axis. The deviated light portion is focused on a bar code detector 51 having a receiving surface arranged in parallel to the central optical axis. The deviating prism is slideably arranged on a wall forming the mount for the lens system 59 and bears an adjusting screw 52 by means of which adjusting screw the distance between the deviating prism 50 and the bar code detector 51 can be corrected. This adjusting measure allows for forming an extremely sharp image on the surface of the bar code detector 51.

This detector emits output signals which are further processed by means of an amplifier 53 which corresponds to the analog signal amplifier 15 described in conjunction with FIG. 1.

Figure 5:
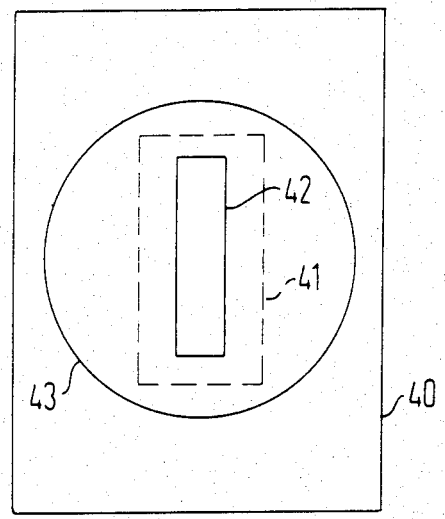
FIG. 5 represents a schematic illustration of the sensing window of such a hard held wand and the corresponding image areas for illuminating the sensor devices.

The utilizing of the light source arrangement 58 and the lens system 59 of the OCR scanning unit for scanning of bar code marks, as well by means of deviating a portion of the reflected light is made possible by a corresponding design of the lens system 59. The reflected light beams 54 illuminate an area which corresponds to the opening of scanning window and which is larger than the active surface of the sensor array 12. The schematic of FIG. 5 represents these conditions. The area designated by 43 corresponds to the mentioned illuminated area whereas the surrounding rectangle 40 represents the outer dimensions of the sensor array 12 having an active surface represented by a rectangle 42 located in the center of the illuminated area 43. A rectangle 41, shown in broken lines, corresponds to the front opening of the scanning tip 52 which defines the scanning window. As may be obtained from this schematic, all light beams falling outside of the rectangle 42 can be utilized for deviating the same onto the reflective-light detector 51 without interference with the OCR scanning unit.

A further preferred embodiment of the combined hand held wand incorporating a replaceable optical system is illustrated in FIGS. 6 and 7, respectively wherein FIG. 7 shows a sectional view along lines 7—7 of FIG. 6. This preferred embodiment includes an integrated optical system 61 which is removably mounted in the housing of the hand held wand by means of screws 60. The optical system 61 includes a lens system and the sensor devices for bar code marks and for OCR characters, as well. In alignment with the optical central axis there is arranged a tubular support member 62 made of plastic which embraces an inner adjusting tube 64 being slideably arranged within the same. This adjusting tube is made of metal and bears the deviating prism 63 attaching to its inner surface. This adjusting tube is accessable through an opening 66 provided in the support member. A groove 65 cut into the outer surface of the wall of the adjusting tube 64 is locatred in alignment with the opening 66 such that the adjusting tube 64 can be slideably moved for adjustment by means of an screwdriver or any other appropriate tool reaching through the opening 66. An end portion of the support member 62 is form of a projecting ring 67 which forms a guiding element for the lens system. The lens system in itself is provided with a separate mount 68 and the guiding ring 67 provides a snug fit for the mount 68 of the lens system.

The opposite end portion of the tubular support member 62 constitutes a flange including a precisely tolerated bearing surface 69 for mounting the sensor array 12 provided for recognizing OCR characters. In addition to this flange and opposite to the mounted deviating prism 63 there is provided an opening 71 arranged in the side wall of the adjusting tube 64. In alignment therewith a small circuit board 73 is mounted onto the outer surface of the supporting member 62. This arrangement is designed such that the light portion reflected from the deviating prism 63 is transmitted through the opening 71 and focused onto the bar code sensor device which is mounted on the circuit board 73.

It is an essential feature of this design of a replaceable optical system to enable an especially easy adjusting of the deviating prism 63. This is achieved after mounting the sensor devices 12 and 70, respectively by means of a screwdriver or any appropriate tool which is positioned through the opening 66 while penatrating into the groove 65. In this manner the adjusting tube 64 can be moved with respect to the supporting member 62 and can be secured in a adjusted final position with respect to the supporting member 62 by means of an adjusting screw 72.

The supporting member 62 constitutes the mount for the optical system and the sensor devices, as well; this determines an especially exactly tolerated arrangement which is unsensitive with respect to temperature changes and vibrations caused by rough handling of the hand held wand. It is a special feature of this design that the entire optical system is assembled and adjusted prior to fitting the same into the housing of the hand held. This design concept allows for much less costly manufacturing.

The preferred embodiments described in conjunction with FIGS. 4, 6 and 7, respectively are designed to utilize the same scanning window for scanning both OCR characters and bar code marks. This structure had the advantage of being of the same handy shape and design as it is known for available hand held wands utilized for reading OCR characters only despite the fact that a second sensor unit and associated networks are incorporated. The necessary mechanical changes are limited to internal adjustments of the support member for the lens system. High reliability, in addition, for recognizing bar code marks is achieved since the bar code detector can be implemented to show a bar shape. This is of special advantage for various applications in practice. Printed bars to be recognized often show flaws such as interruptions which can be caused by printing the bars with matrixs printers or laser printers. Such failures of print may lead to misinterpretations if point shaped detectors are utilized for recognition whereas a bar shaped active surface of the scanning unit does eliminate the impact of such flaws. No additional electric power has to be supplied as compared to conventional OCR readers, and correspondingly no additional heat is developed within the scanning tip. Even more, an additional reduction of the dissipated heat is made possible by utilizing the light source arrangement 58 for scanning OCR characters and for bar code marks, as well.

There has thus been shown and described a novel hand held wand for recognizing both OCR characters and bar code marks, which fulfills all the objects and advantages sought therefor. Many changes, modifications, variations and other uses and applications of the subject invention will, however, become apparent to those skilled in the art after considering the specification and the accompanying drawings, which disclose preferred embodiments thereof. All such changes, modifications, variations and other uses and applications which do not depart from the spirit and scope of the invention are deemed to be covered by the invention which is limited only by the claims which follows.

What is claimed is:

1. An optical wand for automatic character recognition designed to be manually movable along a line of print of a data carrier for recognizing optical characters and bar code marks, respectively and including a scanner unit incorporating a light source for illuminating a scanning window via reflected light and the portion of the data carrier appearing therein, an optical system and a sensing unit, said optical wand comprising:
   a housing body having a nose section including a scanning tip with the optical system being located within the nose section, the housing body having a handle section adapted for manually gripping and angularly extending away from the nose section and the nose section includes a tip having an
   aperture serving as the scanning window for the optical system commonly utilized for scanning of both optical characters and bar code marks and means for receiving the reflected light, and means for deflecting said reflected light; and
   said sensing unit being arranged in said housing and being composed of first and second sensor devices, the first sensor device being arranged in alignment with said aperture for directly receiving one portion of reflected light and the second sensor device being arranged for receiving another portion of the reflected light from said deflecting means.

2. The optical wand as recited in claim 1, wherein said deflecting means comprises a deflecting prism having an adjusting screw for changing the distance of the deflecting prism from said second sensor device.

3. The optical wand as recited in claim 2, wherein said optical system further comprises:
   a tubular support member having a first and a second end portion and being replaceably mounted within said housing in alignment with said scanning tip;
   said first end of portion facing the scanning tip and bearing a lens system, and the sensor devices being mounted onto said support member in proximity of the second end portion;
   an inner adjusting tube coaxially and slideably arranged within said support member and bearing said deviating prism attached to its inner wall adjacent to said second end portion of said support member; and
   means for moving and lacking said inner moving tube with respect to said support member.

4. The optical wand as recited in claim 3, wherein said adjusting and securing means further comprise:
   a groove cut into the outer surface of the wall of the adjusting tube in a direction perpendicular to the central axis of the adjusting tube;
   an opening provided in the wall of the supporting member in alignment with said groove; and
   a threaded opening provided in the wall of the supporting member and a screw arranged therein for securing the slideably arranged adjusting tube with respect to the support member in an adjusted position.

5. The optical wand as recited in claim 4, wherein the first end portion of the support member forms a guiding shoulder and the lens system comprises a separate mount fastened to said guiding shoulder; and wherein the second end portion comprises a collar for mounting the sensor device for recognizing optical characters, an opening in the side wall arranged opposite to said deviating prism, and in alignment therewith a bearing surface provided on the outer surface of said support member for attaching a sensor array for recognizing bar code marks.

* * * * *